US009215157B2

(12) United States Patent
Qian et al.

(10) Patent No.: US 9,215,157 B2
(45) Date of Patent: Dec. 15, 2015

(54) ADAPTIVE BANDWIDTH ESTIMATION

(75) Inventors: Tin Qian, Bellevue, WA (US); Jin Li, Bellevue, WA (US); Tanner M. Hodgeson, Redmond, WA (US); Sanjeev Mehrotra, Kirkland, WA (US); Jiannan Zheng, Sammamish, WA (US); Timothy M. Moore, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1076 days.

(21) Appl. No.: 13/288,968

(22) Filed: Nov. 4, 2011

(65) Prior Publication Data
US 2013/0114421 A1 May 9, 2013

(51) Int. Cl.
*H04J 3/16* (2006.01)
*H04L 12/26* (2006.01)

(52) U.S. Cl.
CPC ........ *H04L 43/0829* (2013.01); *H04L 43/0852* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 7,188,172 B2 | 3/2007 | del Val et al. | |
| 7,554,922 B2 | 6/2009 | Vega-Garcia et al. | |
| 7,784,076 B2 | 8/2010 | Demircin et al. | |
| 8,553,540 B2 * | 10/2013 | Mehrotra et al. | 370/230 |
| 2002/0169880 A1 | 11/2002 | Loguinov et al. | |
| 2005/0228896 A1 | 10/2005 | Nishida | |
| 2007/0177626 A1 | 8/2007 | Kotelba | |
| 2009/0164657 A1 * | 6/2009 | Li et al. | 709/233 |
| 2011/0051607 A1 | 3/2011 | Begen | |
| 2012/0281715 A1 * | 11/2012 | Shojania et al. | 370/468 |

OTHER PUBLICATIONS

Gerla, et al., "TCP Westwood with Adaptive Bandwidth Estimation to Improve Efficiency/Friendliness Tradeoffs", Retrieved at << http://www.cs.ucla.edu/NRL/hpi/tcpw/tcpw_papers/tcpwcrb-cc2003.pdf>>, 2003, pp. 1-24.
"Congestion Control for Delay Sensitive Applications", U.S. Appl. No. 12/762,016, filed Apr. 16, 2010, pp. 47.
"United States Patent Application for Universal Dynamic Bandwidth Management", U.S. Appl. No. 12/970,952, filed Dec. 17, 2010, pp. 43.
Jammeh, et al., "Delay-based Congestion Avoidance for Video Communication with Fuzzy Logic Control", Retrieved at << citeseerx.ist.psu.edu/viewdoc/download?doi=10.1.1.65...rep . . . >>, Dec. 6, 2007, pp. 10.

(Continued)

*Primary Examiner* — Duc C Ho
(74) *Attorney, Agent, or Firm* — Tom Wong; Micky Minhas

(57) ABSTRACT

It can be determined whether relative one way delay for data packets in a data stream exceeds a delay threshold. If so, then a delay congestion signal indicating that the relative one way delay exceeds the delay threshold can be generated. The delay congestion signal can be used in calculating an adaptive bandwidth estimate for the data stream. A packet loss rate congestion signal may also be used in calculating the bandwidth estimate. It can be determined whether a data stream of data packets is in a contention state. If the data stream is in the contention state, then an adaptive bandwidth estimate can be calculated for the data stream using a first bandwidth estimation technique. If the data stream is not in the contention state, then the bandwidth estimate for the data stream can be calculated using a second bandwidth estimation technique.

20 Claims, 9 Drawing Sheets

(56) References Cited

OTHER PUBLICATIONS

Shalunov, et al., "Low Extra Delay Background Transport (LEDBAT) draft-ietf-ledbat-congestion-08.txt", Retrieved at << http://tools.ietf.org/html/draft-ietf-ledbat-congestion-08>>, Oct. 9, 2011, pp. 20.

Li, et al., "Research on Adaptive Congestion Control Based on One Way Delay", IEEE International Conference on Granular Computing, Nov. 2-4, 2007, pp. 580-583.

Flyod, et al., "RFC 5348—TCP Friendly Rate Control (TFRC): Protocol Specificat", Retrieved at << http://www.faqs.org/rfcs/rfc5348.html>>, Sep. 2008, pp. 48.

Allman, et al., "TCP Congestion Control", Sep. 2009, pp. 19.

* cited by examiner

ADAPTIVE BANDWIDTH ESTIMATION

BACKGROUND

Applications often rely on estimation of network bandwidth to properly manage network usage. For example, real time communication software may manage network usage among different modalities such as audio, video, file and application sharing to achieve optimal end to end user experiences. The encoding rate of the different modalities can be obtained from the network bandwidth estimate. Such applications have relied on packet pair and/or packet train approaches to estimate the bandwidth of bottlenecks for a particular network path. Also, TCP (Transmission Control Protocol) deploys a congestion control algorithm in providing network transport. This TCP algorithm monitors packet loss rates and controls congestion by adjusting sending rates according to the packet loss rates.

SUMMARY

It has been found that existing approaches to bandwidth estimation and congestion control have drawbacks, especially when used with real time communication applications. Tools and techniques described herein relate to estimating bandwidth. For example, bandwidth estimates may take into account relative one way delay of packets. Relative one way delay is the one way delay of a packet relative to one or more reference packets, such as relative to a first packet in a stream or a packet with a minimum delay within a window. Calculations of relative one way delay may take into account and correct for clock drift using clock drift estimates. Also, the relative one way delay calculations may use statistical techniques to combine delay features from multiple packets, such as by using moving averages, etc. As another example of the tools and techniques, the bandwidth estimates may take into account whether characteristics of the data stream indicate contention with other data streams.

In one embodiment, the tools and techniques can include determining whether relative one way delay for data packets sent across a computer network in a data stream from a sending node to a receiving node exceeds a delay threshold (such as a threshold delay value and/or a number of consecutive delay values that exceed a threshold delay value). If so, then a delay congestion signal indicating that the relative one way delay exceeds the delay threshold can be generated. The delay congestion signal can be used in calculating an adaptive bandwidth estimate for the data stream.

In another embodiment of the tools and techniques, it can be determined whether a data stream of data packets sent across a computer network from a sending node to a receiving node is in a contention state. The contention state can indicate a state of contention with one or more other data streams, where the other data stream(s) are tending to take more than a fair share of the available bandwidth. For example, one or more of the other data streams may be using a rate control technique that differ from a rate control technique for the present data stream, such as a technique only considers loss rates, and not delays, in controlling congestion. This could allow the other data stream(s) to keep increasing their sending rate(s) even if network delay was increasing. If the data stream is in the contention state, then an adaptive bandwidth estimate can be calculated for the data stream using a first bandwidth estimation technique. This first bandwidth estimation technique may be a technique that allows the data stream to use its fair share of the bandwidth, even in the presence of other contending data streams. If the data stream is not in the contention state, then the bandwidth estimate for the data stream can be calculated using a second bandwidth estimation technique that is different from the first bandwidth estimation technique. The data stream may not be in the contention state even if other data streams are present, and even if there is congestion. For example, the present data stream may not be in a state of contention, even if there is congestion, if all the other data streams are using the same type of bandwidth estimation and congestion control technique as the present data stream.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
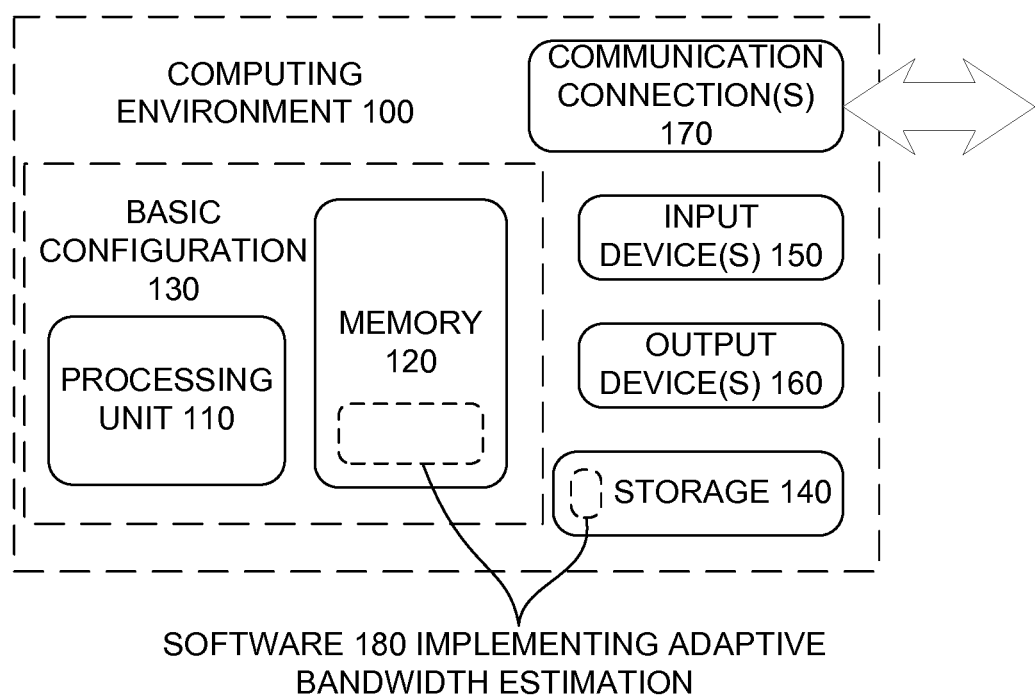
FIG. 1 is a block diagram of a suitable computing environment in which one or more of the described embodiments may be implemented.

Embodiments described herein are directed to techniques and tools for improved adaptive bandwidth estimation. Such improvements may result from the use of various techniques and tools separately or in combination.

Such techniques and tools may include using a relative one way delay congestion signal in estimating an adaptive bandwidth for a data stream. In one implementation, an initial bandwidth estimate may be generated using a technique that does not consider relative one way delay, such as a packet pair or packet train technique that does not consider relative one way delay. The relative one way delay congestion signal may then be used to repeatedly update the initial bandwidth estimate, as occurrences of relative one way delay are calculated and analyzed. Computing relative one way delay can take into account clock differences and clock drift between clocks of the sending and receiving nodes.

Also, a bandwidth estimation technique may take into account whether characteristics of the data stream indicate contention with another data stream. A different bandwidth estimation technique can be used depending on whether such a contention state is indicated. For example, if no contention is indicated, then the bandwidth estimate may take into account a packet loss rate congestion signal and a relative one way delay congestion signal. If either signal indicates congestion, the bandwidth estimate may be decreased. On the other hand, if contention is indicated, then the bandwidth estimate may be based on the packet loss rate congestion signal, without considering the delay congestion signal. Accordingly, the bandwidth estimate may not be decreased due to increased packet delay that is not accompanied by increased packet loss. This can allow the data stream to obtain its fair share of bandwidth when the data stream is competing with other data streams that do not decrease their bandwidth in response to increased packet delays. In some situations, no rate control or bandwidth estimate adjustment may be performed in the non-contention state. For example, this may be the case when the bandwidth estimate is larger than what the application wishes to use, and no congestion signals of delay or loss are detected. As an example, for applications with bursty traffic patterns, the sending rate may often be below the estimated bandwidth. As another example, the average sending rate of multimedia or video may also be below the estimated bandwidth. In such cases, if no delay or loss congestion signal is detected, the bandwidth estimate may not be updated (increased). Additionally, these uncongested periods where the sending rate is below the estimated bandwidth may be used to obtain the delay and loss thresholds above which congestion is declared. This can be done by learning the delay and loss values seen in the uncongested state.

The subject matter defined in the appended claims is not necessarily limited to the benefits described herein (e.g., obtaining a fair share of bandwidth from competing data streams, effectively accounting for clock drift, etc.). A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a sending node, a receiving node, and/or an environment for making adaptive bandwidth estimates. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing adaptive bandwidth estimation.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "generate", "calculate," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Adaptive Bandwidth Estimation System and Environment

A. General Environment

Figure 2:
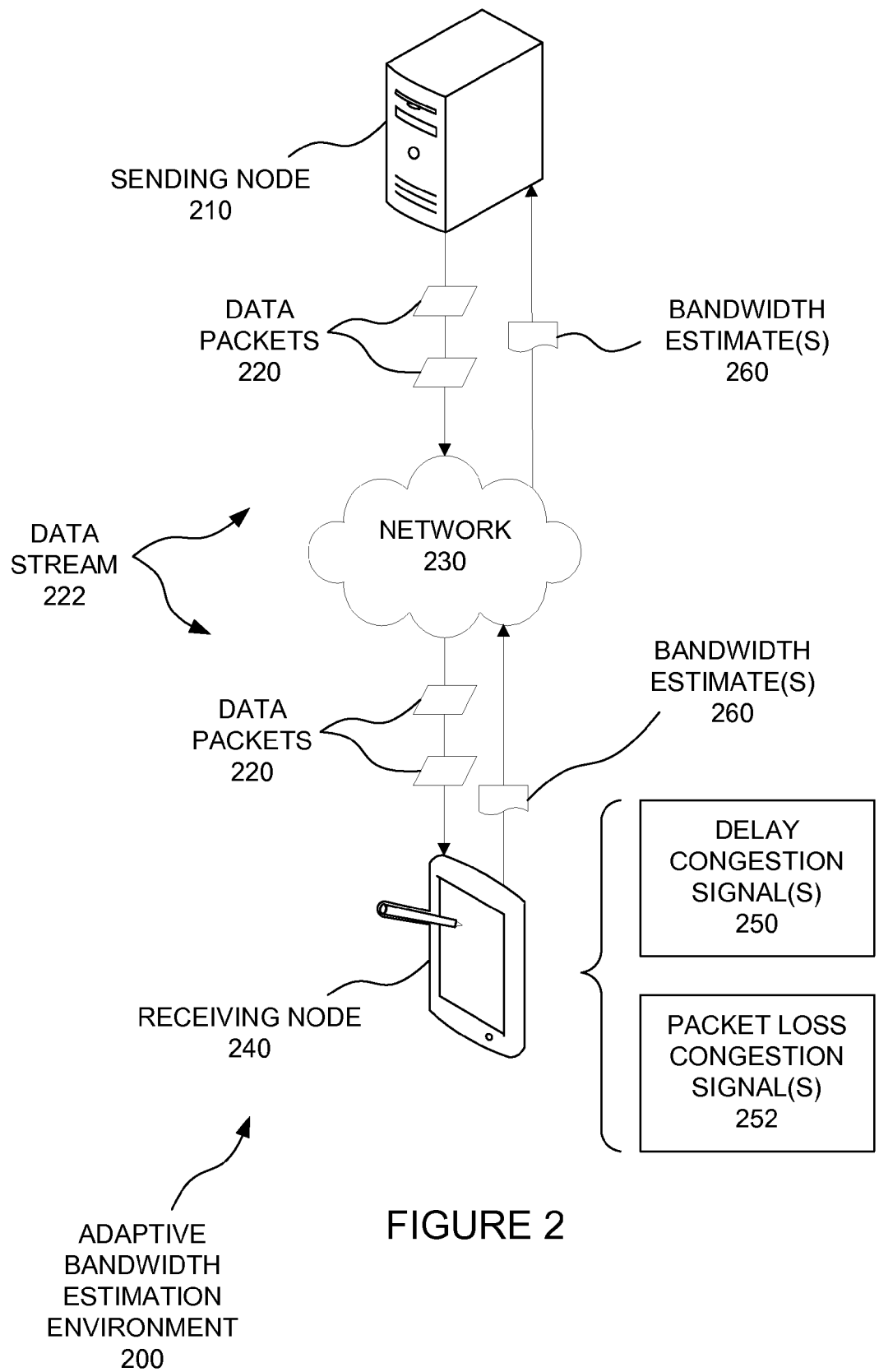
FIG. 2 is schematic diagram of an adaptive bandwidth estimation environment.

FIG. 2 is a block diagram of an adaptive bandwidth estimation environment (200) in conjunction with which one or more of the described embodiments may be implemented. The adaptive bandwidth estimation environment (200) can include a sending node (210), which can send data packets (220) in a data stream (222) over a network (230) to a receiving node (240). The network (230), the sending node (210), and the receiving node (240) may include any of various different types of devices. For example, one or more of the nodes (210 and 240) may be a server machine (or multiple server machines), a handheld device, a laptop or desktop computer, etc.

In one implementation, the receiving node (240) can generate packet loss congestion signals (250) and delay congestion signals (250) when specified congestion conditions are met, as will be described more below. The receiving node (240) can use the delay congestion signals (250) and packet loss congestion signals (252) in calculating bandwidth estimates (260). The calculated bandwidth estimates (260) may be updates to current bandwidth estimates (260). For example, in one implementation, an initial bandwidth estimate (260) may be generated using a technique such as the known packet pair or packet train techniques. That bandwidth estimate (260) can be updated with a newly-calculated bandwidth estimate (260) that is calculated using the delay congestion signals (250) and the packet loss congestion signals (252). Such updated bandwidth estimates (260) can be repeatedly updated as new delay congestion signals (250) and packet loss congestion signals (252) are calculated and analyzed. The sending node (210) can use the bandwidth estimate (260) to control a sending rate of the data packets (220) in the data stream (222).

The congestion signals (250 and 252) and the bandwidth estimates (260) could be generated by different devices. For example, the receiving node (240) could send timestamp information to the sending node (210), and the sending node (210) could use that timestamp information to calculate the congestion signals (250 and 252). The sending node (210) could also use the congestion signals (250 and 252) to calculate the bandwidth estimates (260). Likewise, the receiving node (240) can send the congestion signals (250 and 252) to the sending node (210) to inform the sending node (210) of the congestion. The sending node (210) could use the delay congestion signals (250) and packet loss congestion signals (252) in calculating bandwidth estimates (260). Accordingly, the congestion signals (250 and 252) may be generated and used within the same node and/or different nodes. Other configurations may also be used. For example, one or more third-party nodes or environments could calculate and/or send out the congestions signals (250 and 252) and/or the bandwidth estimates (260).

B. Adaptive Bandwidth Estimation Implementation

An implementation of adaptive bandwidth estimation will now be described with reference to FIGS. 3-6, which are schematic state diagrams that illustrate examples of calculations for bandwidth estimation. In the implementation, two types of congestion signals can be utilized: one for relative one way delay (ROWD), and one for loss rate. The implementation can also include detecting characteristics that can indicate contention with other data streams and adapting to such contention.

1. Delay Congestion State Module

Figure 3:
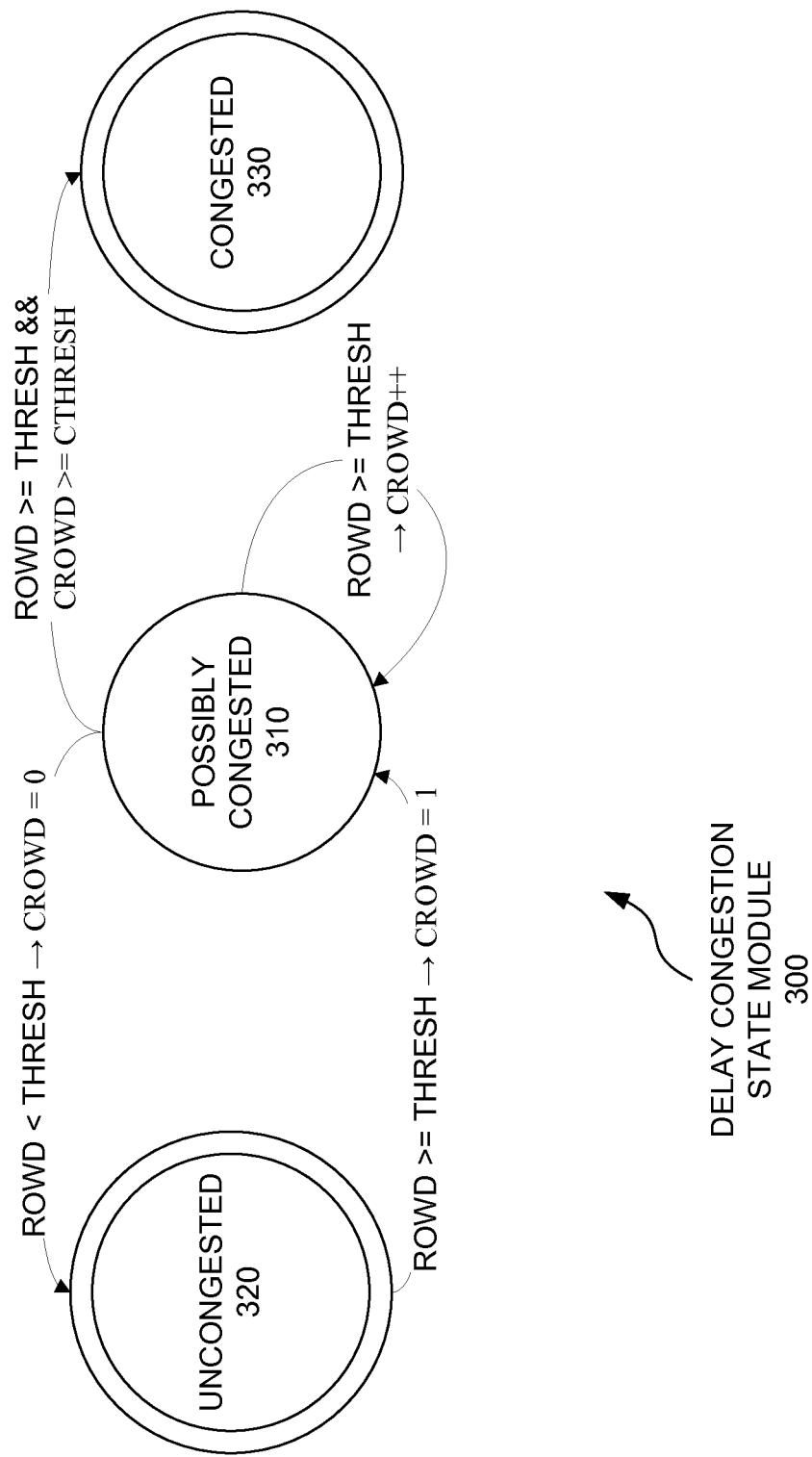
FIG. 3 is a schematic state diagram for a delay congestion state module.

Referring now to FIG. 3, operation of a delay congestion state module (300) is illustrated. The delay congestion state module (300) can take ROWD as input and report congestion if the ROWD is greater than a threshold (THRESH) for some consecutive number of occurrences (CTHRESH). As an example, ROWD may be calculated and analyzed once per pre-determined period of time, once per packet received, or at some other regular or irregular interval. In FIG. 3, and elsewhere herein, the symbol && means "and", and the symbol || means "or." As illustrated in FIG. 3, the state can transition between a possibly congested state (310), an uncongested state (320), and a congested state (330). From the uncongested state (320), if ROWD is greater than or equal to THRESH, then the delay congestion state module (300) transitions to the possibly congested state (310) and a counter, CROWD, is set to 1. CROWD represents how many consecutive occurrences of ROWD have been at least as high as THRESH. In the possibly congested state (310), each time an occurrence of ROWD exceeds or equals THRESH, CROWD can be incremented. If there is an occurrence of ROWD that is less than THRESH, then the delay congestion state module (300) can return to the uncongested state (320). If CROWD is incremented to the point that it equals or exceeds CTHRESH, then the delay congestion state module can enter the congested state (330), and can generate a delay congestion signal. This technique can continue as new occurrences of ROWD are received and analyzed by the delay congestion state module (300).

An example of calculating ROWD will now be described. ROWD here measures how much higher the one way delay is than the one way delay of a reference packet. For example, the reference packet may be a packet with the lowest delay within a window, such as a sliding window, or the first second of a data stream. As another example, the reference packet may be a packet with the lowest delay thus far in a data stream, with the reference packet being adjusted if a new lowest-delay packet is analyzed. The calculation of ROWD can include a calculation of clock drift, which can be an estimate of clock drift.

a) Choosing a Reference Packet to be Used in Calculating ROWD

As noted above, a reference packet can be chosen to allow the calculation of ROWD to include an estimated correction for clock offset and drift. In the calculation of clock drift, the difference $RR_i$ between receive times of the current packet (packet i) and a reference packet (packet 0) can be defined as follows:

$RR_i = \text{recvTime}_i - \text{recvTime}_0$ (using receiving node clock), where $\text{recvTime}_i$ is the receive time of packet i using the receiving node clock and $\text{recvTime}_0$ is the receive time of packet 0 using the receiving node clock.

The difference $RS_i$ between send times of the current packet (packet i) and a reference packet (packet 0) can be defined as follows:

$RS_i = \text{sendTime}_i - \text{sendTime}_0$ (using sending node clock), where $\text{sendTime}_i$ is the sending time of packet i using the sending node clock and $\text{sendTime}_0$ is the sending time of packet 0 using the sending node clock.

In addition, the difference $SR_i$ in receive time of packet i and the send time of packet 0, both using the sending node's clock, can be defined as follows:

$SR_i = \text{recvSendTime}_i - \text{sendTime}_0$ (using sending node clock), where $\text{recvSendTime}_i$ is the received time of packet i according to the sending node clock, and $\text{sendTime}_0$ is as defined above.

The equation for $SR_i$ can be rewritten as follows:

$$SR_i = \frac{RR_i}{\Delta + 1} - \theta,$$

where $(\Delta+1)$ is the clock drift of the sending and receiving node clocks, and $\theta$ is the clock offset between the sending and receiving node clocks.

The queuing delay, $\delta_q$, using the sender clock, can be given by the following:

$$\delta = \delta_q + \delta_{prop} = \text{recvSendTime} - \text{sendTime} = SR - RS,$$

where $\delta$ is total delay and $\delta_{prop}$ is propagation delay. From this equation, the following equation for $\delta_q$ can be derived:

$$\delta_q = \frac{\text{recvTime} - \text{recvTime}_0}{\Delta + 1} - (\theta + \delta_{prop}) - (\text{sendTime} - \text{sendTime}_0).$$

For uncongested packets where $\delta_q \approx 0$, linear regression can be used to compute approximate $\Delta$, and $\theta' = \theta + \delta_{prop}$. That is, clock drift ($\Delta$) can be computed using uncongested packets, but this may not allow a computation of clock offset ($\theta$). The computation can allow computation of clock offset plus the propagation delay ($\theta'$).

Given initial estimates of $\Delta$ and $\theta'$, the initial estimates can be updated using uncongested packets (those where $\delta_q \approx 0$). For example, uncongested packets can be defined as those with the minimum one-way delay (or ROWD, as discussed below) over a given window (using current estimates of clock drift and clock offset), or those where round trip time (RTT, which is the time it takes for the sender to send the packet to the receiver plus the time it takes for the receiver to send an acknowledgement back to the sender) is close to the minimum (provided RTT is available). Accordingly, moving average estimates of $\Delta$ and $\theta'$ for an nth packet can be given as follows:

$$\Delta_n = \alpha \Delta_{n-1} + (1 - \alpha) \frac{RR}{RS + \theta'},$$

$$\theta'_n = \alpha \theta'_{n-1} + (1 - \alpha) \left( \frac{RR}{\Delta + 1} - RS \right),$$

where $\alpha$ is a constant that provides a weight to the moving average values for $\Delta_n$ and $\theta'_n$.

Additionally, the following inequalities can hold true: $\delta_q \geq 0$ and $\delta_q \leq RTT$ (if RTT is available). This can give the following bounds on $\theta'$ for each packet:

$$\frac{RR}{\Delta + 1} - RS - RTT \leq \theta' \leq \frac{RR}{\Delta + 1} - RS.$$

Thus, the clock offset plus propagation delay ($\theta'$) can be at least the minimum clock drift adjusted one-way delay $$\left( \frac{RR}{\Delta + 1} - RS - RTT \right).$$

However, $\theta$ may grow if "uncongested" packets start having larger one way delay. Thus, an approximation of a reference packet with minimum one way delay may be to use a packet with a minimum one way delay over some sliding window for the reference packet. An example of using such a reference packet in the calculation of ROWD will be discussed below.

b) Calculation of Relative One Way Delay Using Reference Packet Times

The calculation of ROWD using information about reference packets will now be discussed, beginning with the following equation:

$$\frac{RR_i}{RS_i} = (\Delta + 1).$$

In this equation, packet i is the current packet, packet 0 is the reference packet, and the other variables are as follows:

Δ=estimated drift;

$RR_i$=recvTime$_i$–recvTime$_0$ (using the receiving node clock);

$RS_i$=sendTime$_i$–sendTime$_0$ (using the sending node clock).

As noted above, it can be useful to use a reference packet with the smallest ROWD within a window, where a window size is at least some amount of time and at least some number of packets. This can facilitate finding packets with the least amount of actual delay, because such packets can have the closest actual one way delay relative to each other and the reference packet.

A new drift estimate for the ith packet can be calculated as a moving average using an existing drift estimate as follows:

$$\Delta'_i = \alpha \cdot \Delta'_{i-1} + (1-\alpha) \cdot \left(\frac{RR_i}{RS_i} - 1\right),$$

where:

$\Delta'_{i-1}$=previous drift estimate;

$\Delta'_i$=current drift estimate;

α=a constant for drift estimate moving average.

The constant α and the other constants herein can be tuned by observing the results of using different constant values with actual network conditions. Different values may affect how quickly the techniques converge on fair and effective bandwidth estimates.

The clock drift compensated ROWD of packet i with reference to packet 0 may be calculated using the following formula:

$$\frac{RR_i - RS_i \cdot (\Delta + 1)}{(\Delta + 1)} = ROWD_i,$$

where:

$ROWD_i$=relative one way delay of packet i;

$RR_i$=recvTime$_i$–recvTime$_0$ (using receiving node clock);

$RS_i$=sendTime$_i$–sendTime$_0$ (using sending node clock);

Δ=drift (calculated using drift estimate discussed above).

2. Loss Rate Congestion State Module

Figure 4:
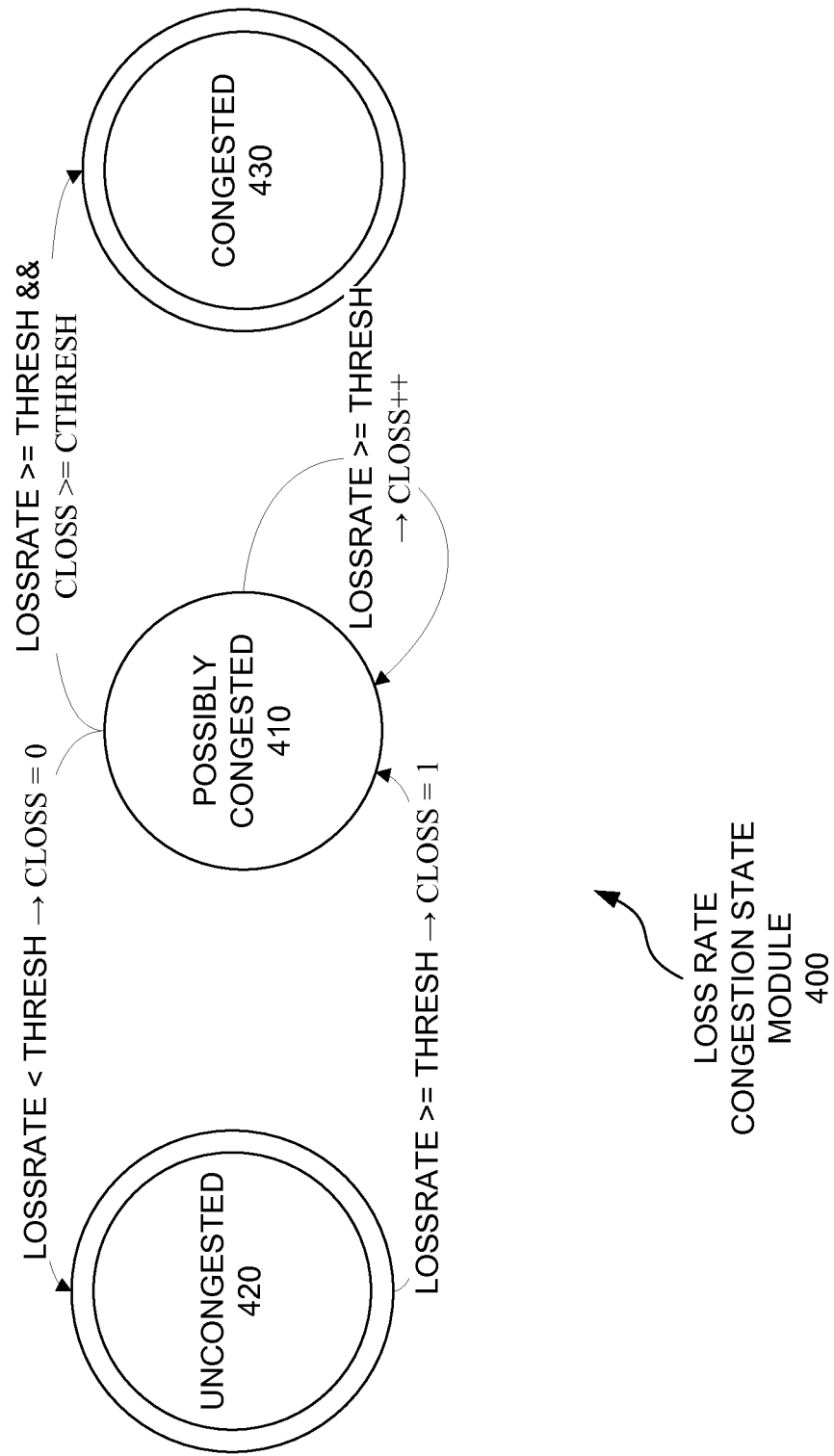
FIG. 4 is a schematic state diagram for a loss rate congestion state module.

Referring now to FIG. 4, operation of a loss rate congestion state module (400) is illustrated. The loss rate congestion state module (400) operates similarly to the delay congestion state module (300) discussed above. The loss rate congestion state module (400) can take the loss rate (LOSSRATE) as input and report congestion if the LOSSRATE is greater than a threshold (THRESH, which is different than the THRESH above for the ROWD threshold) for some consecutive number of occurrences (CTHRESH, which again is different than the count threshold CTHRESH above for the ROWD threshold). As an example, LOSSRATE may be calculated and analyzed once per pre-determined period of time, once per packet received, or at some other regular or irregular interval. As illustrated in FIG. 4, the state can transition between a possibly congested state (410), an uncongested state (420), and a congested state (430). From the uncongested state (420), if LOSSRATE is greater than or equal to THRESH, then the loss rate congestion state module (400) can transition to the possibly congested state (410) and a counter, CLOSS, can be set to 1. In the possibly congested state (410), each time an occurrence of LOSSRATE exceeds or equals THRESH, CLOSS can be incremented. If there is an occurrence of LOSSRATE that is less than THRESH, then the loss rate congestion state module (400) can return to the uncongested state (420). If CLOSS is incremented to the point that CLOSS equals or exceeds CTHRESH, then the loss rate congestion state module (400) can enter the congested state (430), and can generate a loss rate congestion signal. This technique can continue as new occurrences of LOSSRATE are received and analyzed by the loss rate congestion state module (400).

C. Contention State Module

Figure 5:
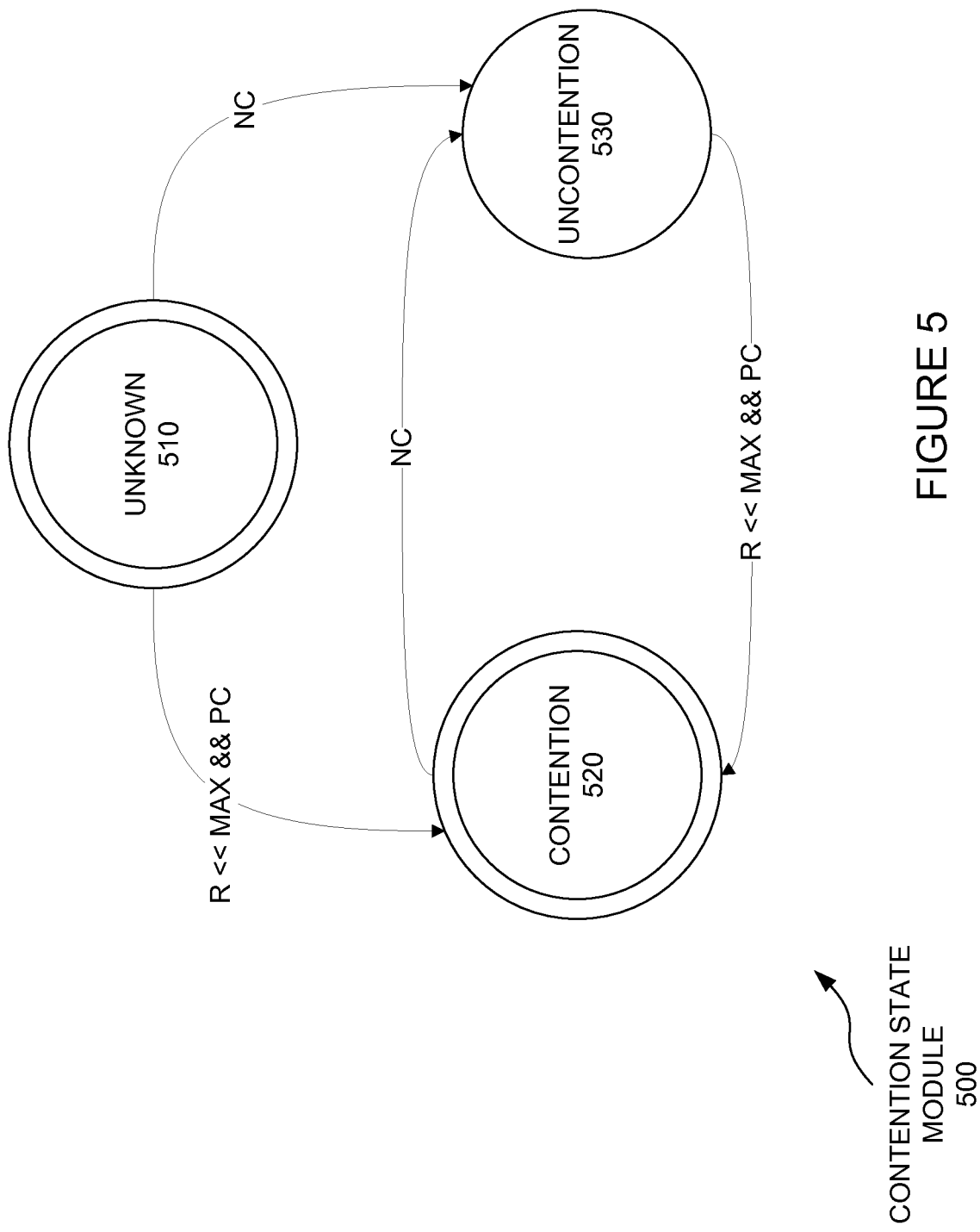
FIG. 5 is a schematic state diagram for a contention state module.

Referring now to FIG. 5, operation of a contention state module (500) will be discussed. The contention state module (500) can determine whether characteristics of a data stream indicate a state of contention with one or more other data streams.

In the state diagram of FIG. 5, the indications NC, R, R<<MAX, and PC can be defined as follows:

nC=ROWD<lowROWDThresh&&LossRate<lowLossRateThresh,

R=currentTotalSendRate,

R<<Max=R is very small, meaning it is below some fixed minimum rate, pC=consecutiveHighROWD>ε∥consecutiveHighLossRate>θ, where lowROWDThresh is a minimum threshold for ROWD, lowLossRateThresh is a minimum threshold for loss rate, currentTotalSendRate is the current total send rate from the sending node, Max is a fixed minimum loss rate, consecutiveHighROWD>ε means that more than £ consecutive occurrences of ROWD have been above a set ROWD threshold as illustrated in FIG. 3, consecutiveHighLossRate>θ means that more than θ consecutive occurrences of loss rate have been above a set loss rate threshold as illustrated in FIG. 4.

The contention state module (500) can start in an unknown state (510). If R<<Max (the send rate is very small) and there is a high ROWD or loss rate, this can indicate that the network is in a contention state (520). Because there can be noise, the contention state module (500) can check whether there have been £ high ROWDs in a row or θ high loss rates in a row. These constants can be set to values that are sufficient to justify signaling a state of contention. If the network is in contention, then the network can remain congested, with no low ROWDs. Accordingly, if there is a low ROWD or low loss rate, the contention state module (500) can enter an uncontention state (530). The contention state module (500) may output a contention signal only when it enters the contention state (520). If the contention state module (500) is called and the state stays in the contention state, the output signal may be a false value, rather than a true value, which would indicate entering the contention state (520).

D. Bandwidth Estimation Update Module

Figure 6:
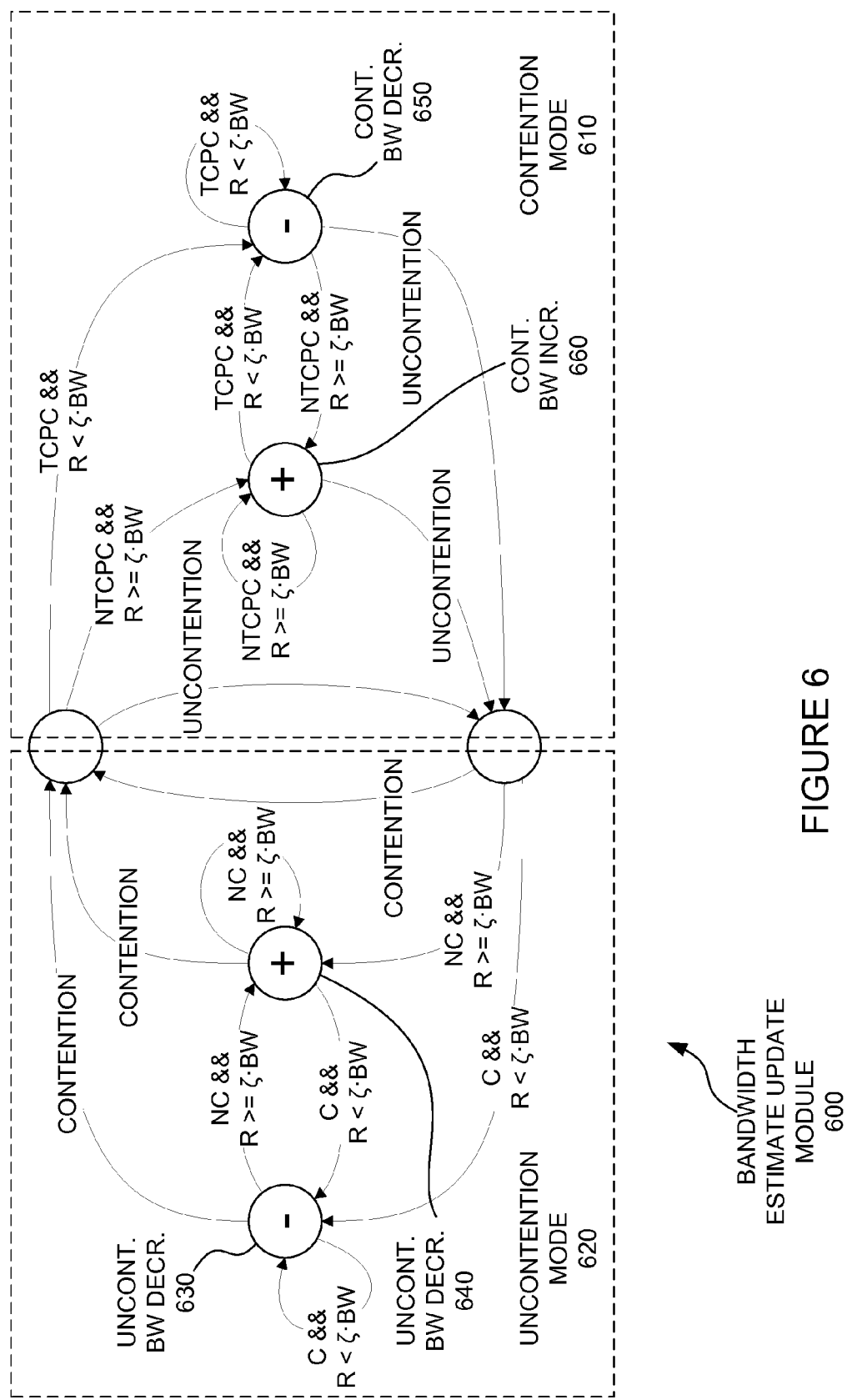
FIG. 6 is a schematic state diagram for a bandwidth estimate update module.

Referring now to FIG. 6, a bandwidth estimate update module (600) will be discussed. The bandwidth estimate update module (600) can receive signals from the delay congestion state module (300), the loss rate congestion state module (400), and the contention state module (500). The bandwidth estimate update module (600) can operate in either a contention mode (610) or an uncontention mode (620), depending on the indicated state from the contention state module (500). The bandwidth estimate update module (600) can also receive indications of a current sending rate, R, and a current bandwidth, BW.

The bandwidth estimate update module (600) can repeatedly evaluate characteristics of the data stream and can repeatedly increment or decrement the bandwidth estimate. The variables in the state diagram of FIG. 6 can be defined as follows:

$C$=(ROWDCongestionSignal||lossCongestionSignal);

$TCPC$=lossCongestionSignal;

$NC$=ROWD<lowROWDThresh&&LossRate<lowLossRateThresh;

$R$=currentTotalSendRate;

$BW$=current bandwidth estimate;

$NTCPC$=LossRate<lowLossRateThresh;

$\zeta$=ceilingThresholdPercent of $B$.

As is illustrated in FIG. 6, in the uncontention mode (620), the bandwidth estimate BW can be decremented in an uncontention bandwidth decrement operation (630) if there is a loss rate or ROWD congestion signal and the sending rate is less than a ceiling threshold percent of the current estimated bandwidth (i.e., C&&R<$\zeta$·BW). Also in the uncontention mode (620), the bandwidth estimate BW can be incremented in an uncontention bandwidth increment operation (640) if ROWD is less than a low ROWD threshold, loss rate is less than a loss rate threshold, and the sending rate is greater than or equal to the ceiling threshold percent of the current estimated bandwidth (i.e., NC&&R>=$\zeta$·BW). Different threshold percents ($\zeta$) of the current estimated bandwidth may be used for each of these two determinations (i.e., the value of $\zeta$ may be different in C&&R<$\zeta$·BW, than the value of $\zeta$ in NC&&R>=$\zeta$·BW). For example, different threshold percents may be used to provide a safety net around the bandwidth estimation technique.

In the contention mode (610), the bandwidth estimate BW can be decremented in a contention bandwidth decrement operation (650) if there is a loss rate congestion signal and the sending rate is less than a ceiling threshold percent of the current estimated bandwidth (i.e., TCPC&&R<$\zeta$·BW). Also in the contention mode (630), the bandwidth estimate BW can be incremented in a contention bandwidth increment operation (660) if the loss rate is less than a loss rate threshold, and the sending rate is greater than or equal to the ceiling threshold percent of the current estimated bandwidth (i.e., NTCPC&&R>=$\zeta$·BW).

The bandwidth estimate update module can use a technique such as an additive increase multiplicative decrease (AIMD) technique to adjust the estimated bandwidth with the bandwidth update operations (630, 640, 650, and 660). For example, the bandwidth decrement operations (630 and 650) can each decrement the estimated bandwidth by multiplying the current bandwidth by a factor $\beta$ to calculate the new estimated bandwidth. The bandwidth increment operations (640 and 660) can each increment the estimated bandwidth by adding a value $\lambda$ to the current bandwidth to calculate the new estimated bandwidth. Accordingly the increment operations (640 and 660, indicated by the + sign) and the decrement operations (630 and 650, indicated by the − sign) can be represented as follows:

−: newBandwidth=$\beta$·maxTotalSendRate;

+: newBandwidth=$\lambda$+currentBandwidth.

The new bandwidth can be sent back to the sending node to allow the sending node to adjust the actual send rate to be within the new bandwidth limit. This could result in the actual send rate being decreased if the bandwidth estimate is decremented or in the send rate being increased if the bandwidth estimate is incremented. The bandwidth estimate update module (600) can continue to successively update its bandwidth estimates as the data stream continues to be sent from the sending node to the receiving node.

III. Adaptive Bandwidth Estimation Techniques

Several adaptive bandwidth estimation techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique.

Figure 7:
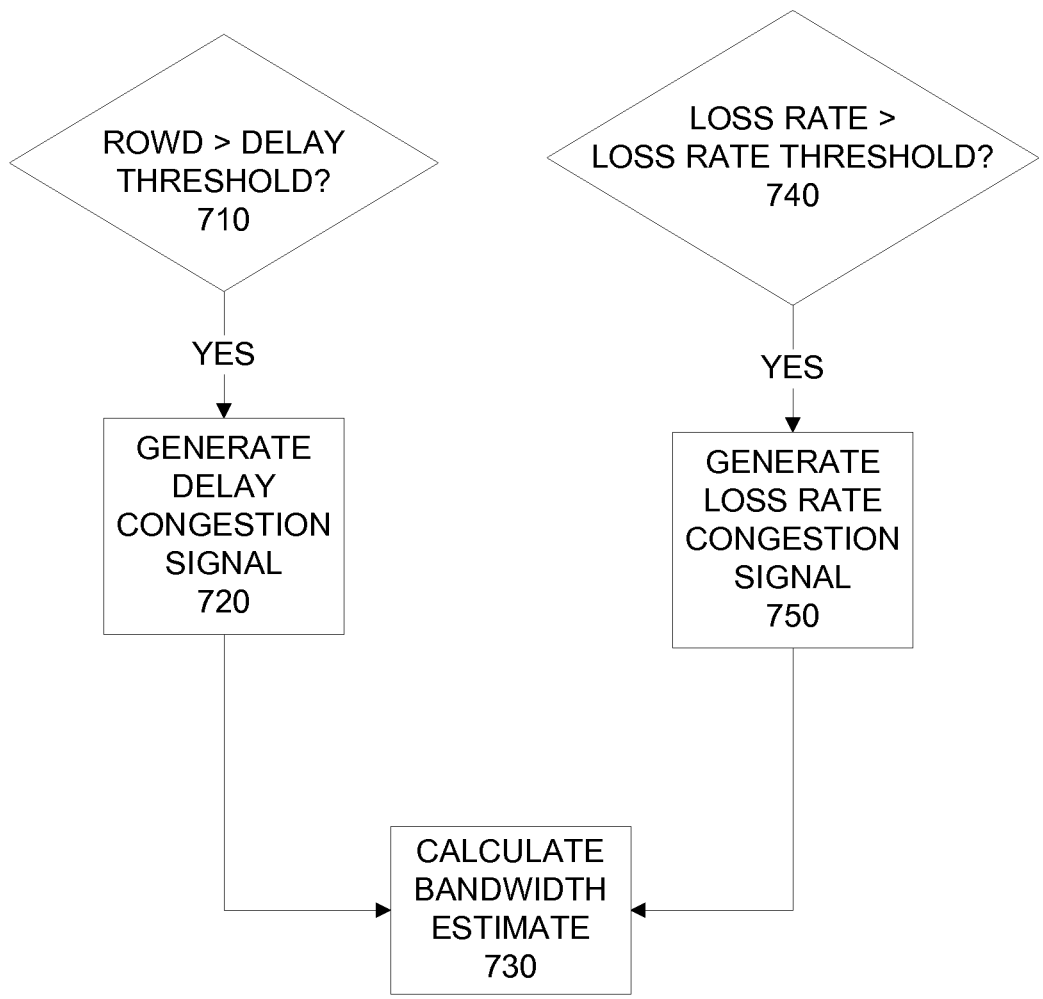
FIG. 7 is a flowchart illustrating an adaptive bandwidth estimation technique.

Referring to FIG. 7, an adaptive bandwidth estimation technique will be described. The technique of FIG. 7 can include determining (710) whether relative one way delay for data packets sent across a computer network in a data stream from a sending node to a receiving node exceeds a delay threshold. For example, the delay threshold may be a single delay value above a threshold, a number of consecutive delay values above a threshold, or some other value representing relative one way delay. Determining (710) can include using an estimate of clock drift. The estimate of clock drift can account for multiple clock drift values, such as where the estimate of clock drift is calculated as a moving average of clock drift estimate values. Determining (710) may include comparing one or more times (e.g., send times and receive times) for a current packet and one or more times (e.g., send times and receive times) for a reference packet.

If the relative one way delay does exceed the delay threshold, then the technique of FIG. 7 can include performing acts that can include generating (720) a delay congestion signal indicating that the relative one way delay exceeds the delay threshold. The delay congestion signal can be used in calculating (730) an adaptive bandwidth estimate for the data stream. Calculating (730) the bandwidth estimate can include updating an existing bandwidth estimate for the data stream. For example, using the delay congestion signal in calculating (730) the adaptive bandwidth estimate for the data stream can include updating an existing bandwidth estimate that is derived from a bandwidth estimate that is not based on relative one way delay (e.g., an estimate based at least in part on a packet pair and/or packet train technique). Updating the existing bandwidth estimate may include determining whether at least one congestion signal of a set of one or more types of congestion signals (which can include the delay congestion signal and/or the loss congestion signal discussed herein) indicates congestion for the data stream. If so, then the existing bandwidth estimate may be decreased by an amount proportional to the current bandwidth estimate (multiplicative decrease). If not, then the bandwidth estimate may be increased by a predetermined amount (additive increase). Also, the delay threshold can incorporate a maximum relative one way delay value, such as where the delay threshold represents a number of consecutive occurrences of relative one way delay in the data stream reaching a maximum relative one way delay value.

The technique of FIG. 7 can further include determining (740) whether a packet loss rate for data packets sent across the computer network in the data stream exceeds a packet loss rate threshold. If so, then a packet loss congestion signal can be generated (750), where the packet loss congestion signal indicates that the packet loss rate exceeds the packet loss rate threshold. The packet loss congestion signal can be used in calculating (730) the bandwidth estimate. The packet loss rate threshold can incorporate a maximum loss rate value, such as where the packet loss rate threshold incorporates a number of consecutive occurrences of packet loss rate in the data stream reaching the maximum loss rate value.

The delay threshold and/or the loss threshold may be calculated using one or more characteristics of the computer network. For example, the threshold(s) may be initially calculated and/or adapted from existing threshold(s) using one or more characteristics such as characteristics of the sending and/or receiving node (e.g., application characteristics, hardware characteristics, etc.), or other characteristics of the network. The delay threshold may be established based on delay for the data stream while the data stream is in an uncongested state. Also, the loss rate threshold may be established based on loss rate for the data stream while the data stream is in an uncongested state. The technique of FIG. 7 may also include limiting a sending rate of the data stream using the bandwidth estimate.

Figure 8:
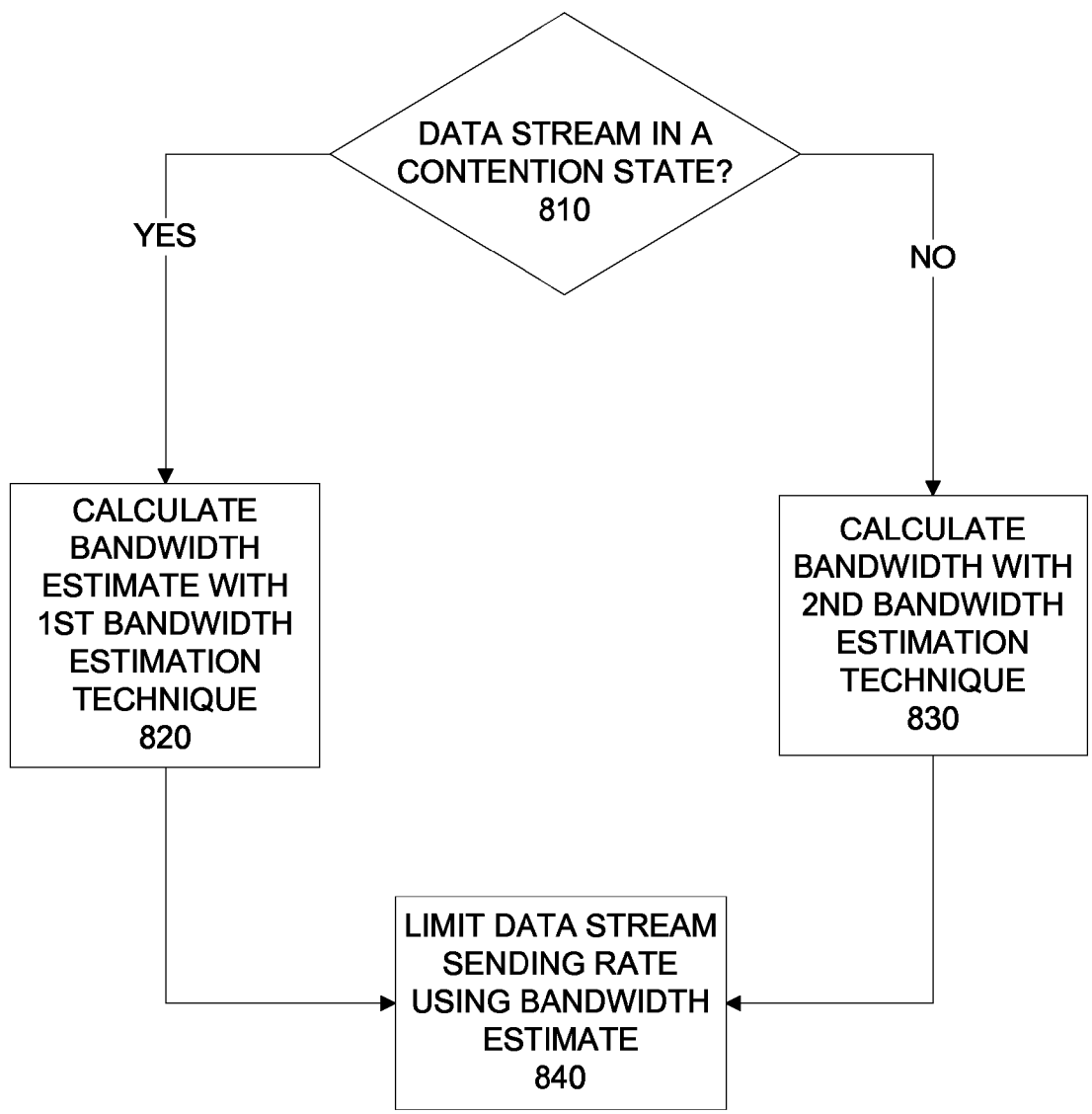
FIG. 8 is a flowchart illustrating another adaptive bandwidth estimation technique.

Referring now to FIG. 8, another adaptive bandwidth estimate technique will be described. The technique of FIG. 8 can include determining (810) whether a data stream of data packets sent across a computer network from a sending node to a receiving node is in a contention state. The contention state can indicate a state of contention with one or more other data streams. If the data stream is in the contention state, then an adaptive bandwidth estimate for the data stream can be calculated (820) using a first bandwidth estimation technique. If the data stream is not in the contention state, then the adaptive bandwidth estimate for the data stream can be calculated (830) using a second bandwidth estimation technique that is different from the first bandwidth estimation technique. Additionally, a sending rate of the data stream can be limited (840) using the bandwidth estimate.

The contention state can include a sending rate characteristic of the data stream that can include a sending rate below a minimum sending rate. The contention state can also include a congestion characteristic of the data stream. The congestion characteristic can be selected from a group consisting of a delay above a delay threshold, a loss rate above a loss rate threshold, and combinations thereof. The delay above the delay threshold can include a single relative one way delay above a relative one way delay value threshold, or another value, such as a consecutive number of relative one way delay values above a relative one way delay value threshold.

The second bandwidth estimation technique can include determining whether delay of data packets in the data stream exceeds a delay threshold (e.g., a single value or number of consecutive values above a threshold value). If the delay exceeds the delay threshold, then acts can be performed. The acts can include generating a delay congestion signal indicating that the delay exceeds the delay threshold, and using the delay congestion signal in calculating the bandwidth estimate. The second bandwidth estimation technique may include maintaining the bandwidth estimate at a current bandwidth estimate value if a current sending rate for the data stream is below the current bandwidth estimate value and the data stream is in an uncongested state.

The first bandwidth estimation technique can be a technique that does not use a delay congestion signal in estimating bandwidth.

The first bandwidth estimation technique and the second bandwidth estimation technique can both include determining whether loss rate of data packets in the data stream exceeds a loss rate threshold, and if the loss rate exceeds the loss rate threshold, then performing acts. The acts can include generating a loss rate congestion signal indicating that the loss rate exceeds the loss rate threshold, and using the loss rate congestion signal in calculating the bandwidth estimate.

Figure 9:
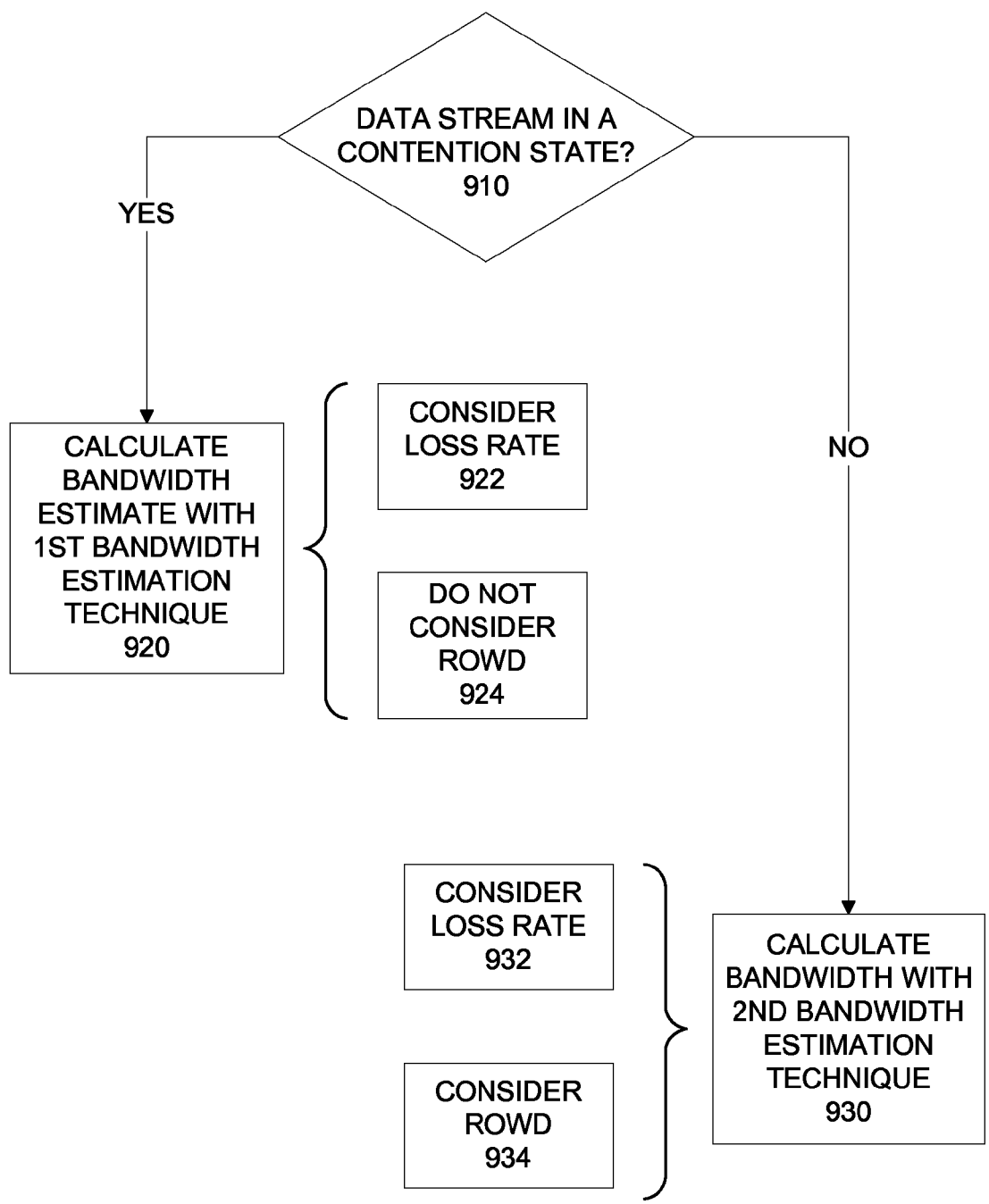
FIG. 9 is a flowchart illustrating yet another adaptive bandwidth estimation technique.

Referring now to FIG. 9, yet another adaptive bandwidth estimation technique will be discussed. The technique of FIG. 9 can include determining (910) whether a data stream of data packets sent across a computer network from a sending node to a receiving node is in a contention state. The contention state can indicate a state of contention with one or more other data streams. The contention state can include a sending rate characteristic of the data stream and a congestion characteristic of the data stream. The sending rate characteristic can include a sending rate below a minimum sending rate. The congestion characteristic can be selected from a group consisting of a congestion signal indicating delay above a delay threshold, a loss rate congestion signal indicating a loss rate above a loss rate threshold, and combinations thereof.

If the data stream is in the contention state, then the technique of FIG. 9 can include calculating (920) an adaptive bandwidth estimate for the data stream using a first bandwidth estimation technique. The first bandwidth estimation technique can include considering (922) a packet loss rate congestion signal, and not considering (924) a congestion signal from relative one way delay of packets. The relative one way delay of packets can represent delay of packets relative to a reference packet and correcting for estimated clock drift.

If the data stream is not in the contention state, then the bandwidth estimate for the data stream can be calculated (930) using a second bandwidth estimation technique that is different from the first bandwidth estimation technique. The second bandwidth estimation technique can consider (932) the packet loss rate congestion signal and can consider (934) the congestion signal from relative one way delay of packets.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    determining that relative one way delay for data packets sent across a computer network in a data stream from a sending node to a receiving node exceeds a delay threshold;
    in response to the determining that the relative one way delay exceeds the delay threshold, performing the following:

generating a delay congestion signal indicating that the relative one way delay exceeds the delay threshold; and using the delay congestion signal in calculating an adaptive bandwidth estimate for the data stream;

determining that a packet loss rate for data packets sent across the computer network in the data stream exceeds a packet loss rate threshold; and in response to the determining that the packet loss rate exceeds the packet loss rate threshold, then performing the following:

generating a packet loss congestion signal that indicates that the packet loss rate exceeds the packet loss rate threshold; and using the packet loss congestion signal in the calculating of the adaptive bandwidth estimate for the data stream.

2. The method of claim 1, further comprising calculating the delay threshold using one or more characteristics of the computer network.

3. The method of claim 1, wherein determining whether the relative one way delay exceeds the delay threshold comprises using an estimate of clock drift.

4. The method of claim 3, wherein the estimate of clock drift accounts for multiple clock drift values.

5. The method of claim 4, wherein the estimate of clock drift comprises a moving average.

6. The method of claim 1, wherein using the delay congestion signal in calculating the adaptive bandwidth estimate for the data stream comprises updating an existing bandwidth estimate that is derived from a bandwidth estimate that is not based on relative one way delay.

7. The method of claim 1, further comprising
establishing the delay threshold based on delay for the data stream while the data stream is in an uncongested state; and establishing the loss rate threshold based on a loss rate for the data stream while the data stream is an uncongested state.

8. The method of claim 1, wherein the packet loss rate threshold incorporates a maximum loss rate value, and wherein the packet loss rate threshold incorporates a number of consecutive occurrences of packet loss rate in the data stream reaching the maximum loss rate value.

9. The method of claim 1, wherein the calculating of the bandwidth estimate comprises:

determining whether at least one congestion signal of a set of one or more types of congestion signals comprising the delay congestion signal indicates congestion for the data stream;

if at least one congestion signal of the set of one or more types of congestion signals indicates congestion for the data stream, then decreasing an existing bandwidth estimate by an amount proportional to the existing bandwidth estimate; and if no congestion signal of the set of one or more types of congestion signals indicates congestion for the data stream, then increasing the existing bandwidth estimate by a predetermined amount.

10. The method of claim 1, wherein the delay threshold incorporates a maximum relative one way delay value, and wherein the delay threshold represents a number of consecutive occurrences of relative one way delay in the data stream reaching a maximum relative one way delay value.

11. The method of claim 1, further comprising limiting a sending rate of the data stream using the bandwidth estimate.

12. A computer system comprising at least one processor, and memory comprising instructions stored thereon that when executed by at least one processor cause at least one processor to perform acts comprising:

determining whether a data stream of data packets sent across a computer network from a sending node to a receiving node is in a contention state, the contention state indicating a state of contention with one or more other data streams;

if the data stream is in the contention state, then calculating an adaptive bandwidth estimate for the data stream using a first bandwidth estimation technique; and if the data stream is not in the contention state, then calculating the bandwidth estimate for the data stream using a second bandwidth estimation technique that is different from the first bandwidth estimation technique.

13. The computer system of claim 12, wherein the second bandwidth estimation technique comprises maintaining the bandwidth estimate at a current bandwidth estimate value if a current sending rate for the data stream is below the current bandwidth estimate value and the data stream is in an uncongested state.

14. The computer system of claim 12, wherein the acts further comprise limiting a sending rate of the data stream using the bandwidth estimate.

15. The computer system of claim 12, wherein the contention state comprises a sending rate characteristic of the data stream comprising a sending rate below a minimum sending rate and a congestion characteristic of the data stream, the congestion characteristic being selected from a group consisting of a delay above a delay threshold, a loss rate above a loss rate threshold, and combinations thereof.

16. The computer system of claim 15, wherein the delay above the delay threshold comprises a relative one way delay above a relative one way delay threshold.

17. The computer system of claim 12, wherein the second bandwidth estimation technique comprises determining whether delay of data packets in the data stream exceeds a delay threshold, and if the delay exceeds the delay threshold, then performing the following:

generating a delay congestion signal indicating that the delay exceeds the delay threshold; and using the delay congestion signal in calculating the bandwidth estimate.

18. The computer system of claim 17, wherein the first bandwidth estimation technique does not use a delay congestion signal in estimating bandwidth.

19. The computer system of claim 17, wherein the first bandwidth estimation technique and the second bandwidth estimation technique both comprise determining whether loss rate of data packets in the data stream exceeds a loss rate threshold, and if the loss rate exceeds the loss rate threshold, then performing the following:

generating a loss rate congestion signal indicating that the loss rate exceeds the loss rate threshold; and using the loss rate congestion signal in calculating the bandwidth estimate.

20. A computer-implemented method, comprising:
performing a first determination at a first time, the first determination comprising determining that a data stream of data packets sent across a computer network from a sending node to a receiving node is in a contention state, and the first determination indicating a state of contention of the data stream with one or more other data streams;

in response to the first determination, calculating an adaptive bandwidth estimate for the data stream using a first bandwidth estimation technique;

performing a second determination at a second time, the second determination comprising determining that the data stream is not in a contention state, and the second determination indicating lack of a state of contention of the data stream with one or more other data streams; and in response to the second determination, calculating an adaptive bandwidth estimate for the data stream using a second bandwidth estimation technique that is different from the first bandwidth estimation technique.

\* \* \* \* \*